United States Patent
Kneib et al.

(10) Patent No.: US 12,172,911 B2
(45) Date of Patent: Dec. 24, 2024

(54) WATER TREATMENT COMPOSITIONS AND METHODS OF USE

(71) Applicant: Dober Chemical Corp., Woodridge, IL (US)

(72) Inventors: Francis Kneib, Phoenix, AZ (US); Everett J. Nichols, Edmonds, WA (US); James R. Scott, Bellevue, WA (US); Ryan Wietholter, Chicago, IL (US)

(73) Assignee: Dober Chemical Corp., Woodridge, IL (US)

( * ) Notice: Subject to any disclaimer, the term of this patent is extended or adjusted under 35 U.S.C. 154(b) by 204 days.

(21) Appl. No.: 15/094,394

(22) Filed: Apr. 8, 2016

(65) Prior Publication Data

US 2016/0221847 A1 Aug. 4, 2016

Related U.S. Application Data

(63) Continuation of application No. 13/851,826, filed on Mar. 27, 2013, now abandoned.

(Continued)

(51) Int. Cl.
*C02F 1/52* (2023.01)
*C02F 101/10* (2006.01)
(Continued)

(52) U.S. Cl.
CPC .......... *C02F 1/5245* (2013.01); *C02F 1/5263* (2013.01); *C02F 2101/10* (2013.01);
(Continued)

(58) Field of Classification Search
CPC ...... B01D 21/01; C02F 1/5245; C02F 1/5263; C02F 1/58; C02F 2101/10;
(Continued)

(56) References Cited

U.S. PATENT DOCUMENTS 3,082,173 A * 3/1963 Horvitz ................. C02F 1/5236
  210/731
4,363,733 A * 12/1982 Meiller ................. C02F 1/5263
  210/730

(Continued)

FOREIGN PATENT DOCUMENTS

CA 2068013 * 7/1993 ............. B01D 17/05
CA 2068013 A1 7/1993

(Continued)

OTHER PUBLICATIONS

SinoPEC-Refinery, Export Product Catalogue, Mar. 2010, p. 48.*

(Continued)

*Primary Examiner* — Patrick Orme
(74) *Attorney, Agent, or Firm* — Michael Best & Friedrich LLP (57) ABSTRACT

Methods for clarifying water, reducing turbidity of water, and removing phosphate from water include adding a water treatment composition having an aluminum-containing coagulant, and a natural non-charged polysaccharide, such as guar. The aluminum-containing compound can include polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate, or a combination thereof.

7 Claims, 2 Drawing Sheets

Related U.S. Application Data (60) Provisional application No. 61/798,333, filed on Mar. 15, 2013, provisional application No. 61/616,943, filed on Mar. 28, 2012.

(51) Int. Cl.
| | | |
|---|---|---|
| *C02F 101/32* | (2006.01) | |
| *C02F 103/10* | (2006.01) | |
| *C02F 103/20* | (2006.01) | |
| *C02F 103/32* | (2006.01) | |
| *C02F 103/34* | (2006.01) | |
| *C02F 103/36* | (2006.01) | |

(52) U.S. Cl.
CPC .... *C02F 2101/105* (2013.01); *C02F 2101/32* (2013.01); *C02F 2103/10* (2013.01); *C02F 2103/20* (2013.01); *C02F 2103/32* (2013.01); *C02F 2103/343* (2013.01); *C02F 2103/365* (2013.01); *C02F 2303/04* (2013.01)

(58) Field of Classification Search
CPC ............ C02F 2101/105; C02F 2101/32; C02F 2103/10; C02F 2103/20; C02F 2103/32; C02F 2103/343; C02F 2103/365; C02F 2303/04; C01F 7/56
See application file for complete search history.

(56) References Cited

U.S. PATENT DOCUMENTS

| | | | | |
|---|---|---|---|---|
| 4,565,635 | A * | 1/1986 | Le Du | C02F 1/52 |
| | | | | 210/727 |
| 5,169,562 | A * | 12/1992 | Mitchell | C10G 33/04 |
| | | | | 516/149 |
| 5,433,863 | A * | 7/1995 | Braden | B01D 17/047 |
| | | | | 166/267 |
| 5,965,027 | A * | 10/1999 | Allen | C02F 1/444 |
| | | | | 210/638 |
| 5,997,838 | A * | 12/1999 | Dulko | C01F 7/007 |
| | | | | 210/702 |
| 6,245,121 | B1 | 6/2001 | Lamy et al. | |
| 6,428,705 | B1 | 8/2002 | Allen | |
| 6,458,268 | B1 | 10/2002 | Grandprey et al. | |
| 7,329,356 | B2 * | 2/2008 | Brady | C02F 1/5245 |
| | | | | 210/702 |
| 7,790,042 | B2 | 9/2010 | Nichols | |
| 8,168,767 | B2 | 5/2012 | Nichols | |
| 8,281,515 | B2 | 10/2012 | Nichols | |
| 8,357,787 | B2 | 1/2013 | Nichols | |
| 2003/0089661 | A1 | 5/2003 | Hulten | |
| 2003/0196944 | A1 | 10/2003 | Tanner | |
| 2003/0213752 | A1* | 11/2003 | Landis | C02F 1/505 |
| | | | | 210/723 |
| 2004/0108277 | A1 | 6/2004 | Krulik | |
| 2005/0242043 | A1 | 11/2005 | Nichols | |
| 2007/0256982 | A1* | 11/2007 | Kelley | C02F 1/5245 |
| | | | | 210/724 |
| 2008/0035580 | A1 | 2/2008 | de Rijk | |
| 2008/0039317 | A1 | 2/2008 | Branlard et al. | |
| 2009/0107917 | A1 | 4/2009 | Capehart | |
| 2010/0196415 | A1 | 8/2010 | Davis et al. | |
| 2010/0326923 | A1 | 12/2010 | Miknevich et al. | |
| 2011/0000854 | A1 | 1/2011 | Nichols | |
| 2011/0006013 | A1 | 1/2011 | Nichols | |
| 2011/0016773 | A1 | 1/2011 | Nichols | |
| 2011/0272362 | A1 | 11/2011 | Sikes et al. | |
| 2011/0309294 | A1 | 12/2011 | Nichols | |
| 2012/0145645 | A1 | 6/2012 | Wietholter | |
| 2012/0190757 | A1 | 7/2012 | Nichols | |
| 2012/0234703 | A1 | 9/2012 | Nichols | |
| 2013/0256235 | A1 | 10/2013 | Kneib et al. | |
| 2015/0090667 | A1* | 4/2015 | Kneib | C02F 1/5245 |
| | | | | 210/728 |

FOREIGN PATENT DOCUMENTS

| | | |
|---|---|---|
| CN | 1843961 A | 10/2006 |
| CN | 102344192 A | 2/2012 |
| JP | 4-74592 A | 3/1992 |
| JP | 2001219005 A | 8/2001 |
| JP | 2006297189 A | 11/2006 |
| WO | 9834877 A2 | 8/1998 |

OTHER PUBLICATIONS

Hubbe, Martin, Mini-Encyclopedia of Papermaking Wet-End chemistry, Jun. 9, 2009, pp. 1-2 (Year: 2009).*
Water Treatment chemicals, PolyAluminum Chloride (RIW-PAC), Jan. 6, 2009, pp. 1-2 (Year: 2009).*
Carson, "Aluminum Compounds" (Year: 2000).*
Bratby, "Coagulation and Flocculation in Water and Wastewater Treatment" (Year: 2006).*
Examination Report mailed Mar. 29, 2016, issued in related New Zealand Application No. 700313, filed Mar. 27, 2013, 4 pages.
Partial European Search Repost mailed Dec. 4, 2015, issued in related European Application No. 13767732.4, filed Mar. 27, 2013, 8 pages.
Notification of First Office Action, mailed Aug. 18, 2015, issued in related Chinese Application No. 20130022940.4, filed Mar. 27, 2013, 21 pages.
Sanghi, R., et al., "Ipomoea dasysperma Seed Gum: an Effective Natural Coagulant for the Decolorization of Textile Dye Solutions," Journal of Environmental Management 81(1):36-41, Oct. 2006.
"Additional Information Exchange on Large Volume Inorganic Chemicals—Solid and Others Industry, Jun. 2005", European Commission, Joint Research Centre, Insitute for Prospective Technological Studies, Sustainability in Industry, Energy and Transport, European IPPC Bureau, Seville, Spain, 53 pages.
Boterro, J.Y., et al "Study of Partially Neutralized Aqueous Aluminum Chloride Solutions: Identification of Aluminum Species and Relation Between the Composition of the Solutions and Their Efficiency as a Coagulant", Progress in Water Technology 12:601-612, 1980.
Gao, B.-Y., and Q-Y. Yue, "Natural Organic Matter (NOM) Removal From Surface Water by Coagulation" Journal od Environmental Sciences 17(1):119-122, 2005.
Heinonen, P. and S. Pisto-Lopez, "Optimization of Chemical Water Treatment Process for Kammeniemi, Polso and Kauppi Water Treatment Plants", Final Thesis, Tempere Polytechnic, Tempere, Finland, May 2007, 77 pages.
International Search Repot and Written Opinion mailed Jul. 12, 2013, issued in corresponding international Application No. PCT/US2013/034169, filed Mar. 27, 2013, 9 pages.
U.S. Office Action, U.S. Appl. No. 14/505,309, mailed May 28, 2015.
U.S. Office Action, U.S. Appl. No. 14/505,309, mailed Feb. 12, 2016.
Advisory Action, U.S. Appl. No. 14/505,309, mailed Jul. 13, 2016.
Peter Gebble, Using polyaluminum coagulants in water treatment, Sep. 2001, 64th annual water industry engineers and operators conference, pp. 39-47.
Flynn, Editor, Nalco Water Handbook, 3rd Edition, 2009, pp. 6.16, 41.21-41.22.
Joly et al., "Interaction of Metal Ions With Mono- and Polysaccharides for Wastewater Treatment: A Review", Nat Prod Chem Res, 2020, vol. 8, No. 3, pp. 1-17.

* cited by examiner

WATER TREATMENT COMPOSITIONS AND METHODS OF USE

CROSS-REFERENCES TO RELATED APPLICATIONS

This application is a continuation of U.S. application Ser. No. 13/851,826, filed Mar. 27, 2013, which claims the benefit of U.S. Provisional Application No. 61/798,333, filed on Mar. 15, 2013, and U.S. Provisional Application No. 61/616,943, filed on Mar. 28, 2012, all of which are herein expressly incorporated by reference.

BACKGROUND

The removal of suspended matter from water is a concern for municipal water treatment plants, industrial water treatment plants, environmental storm water, and recreational water. Coagulation and flocculation are well known processes for the removal of suspended matter. Coagulation may be viewed as the initial process of destabilizing or neutralizing charges on suspended particles so that they begin to aggregate. Coagulation is usually combined with flocculation, sedimentation, or filtration. Flocculation is the aggregation of the particles into larger masses. There are presently many chemicals on the market that assist with coagulation and/or flocculation. Among these are the metal salts, such as polyaluminum chlorides, aluminum sulfate, ferric sulfate, and ferric chloride. Cationic polymers, such as chitosan, may also be used as coagulants. Chitosan is a polymer derived from naturally occurring chitin. Chitin is a linear polysaccharide composed of $\alpha$-(1-4)-linked 2-acetoamido-2-deoxy-D-glucose units that occur naturally in the exoskeleton of invertebrates, in particular, the carapace of marine crustaceans. Chemical deacetylation of chitin yields chitosan, which is a copolymer of 2-amino-2-deoxy-D-glucose and 2-acetoamido-2-deoxy-D-glucose units.

While it is known that water turbidity can be reduced using metallic salts, it is generally desirable to reduce the overall amount of metallic salts used, while maintaining the desired water clarity. Accordingly, new ways of using metallic salts are constantly being sought.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Some embodiments are related to a composition that is used for clarifying and reducing the turbidity of water by treating the water with a water treatment composition comprised of guar and polyaluminum chloride or aluminum chlorohydrate or polyaluminum chlorohydrate or aluminum sulfate or sodium aluminate or polyaluminum sulfate or polyaluminum silicate chloride or polyaluminum silicate sulfate, or a combination thereof so as to cause the agglomeration and subsequent removal of shear-stable insoluble suspended and/or partially water-soluble flocs and aggregates by collection on or within a filter media that allows easier more efficient backwashing and improved prolonged use of said filter media. The method comprises adding an effective amount of the water treatment composition to the water containing insoluble suspended and/or partially water soluble dissolved material and allowing the water treatment composition to interact with the suspended insoluble or soluble matter in order to allow the matter to agglomerate and settle under gravity and/or float to the surface. The agglomerated matter can be separated from the water by any of a number of means known in the art such as filtration, gravity settling, centrifugation, cyclone separator, vacuum filtration, or by flotation and skimming.

The water treatment composition can be comprised of a liquid solution containing an aluminum-containing compound such as polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate, or a combination thereof and a water-soluble natural non-chemically derivatized polysaccharide(s) derived from a plant, microbe, or animal.

An exemplary embodiment of the water treatment composition comprises the polysaccharide guar and polyaluminum chloride.

Another exemplary embodiment of the water treatment composition comprises guar and aluminum sulfate.

Another exemplary embodiment of the water treatment composition comprises guar and aluminum chlorohydrate.

Another exemplary embodiment of the water treatment composition comprises guar and polyaluminum chlorohydrate.

Another exemplary embodiment of the water treatment composition comprises guar and sodium aluminate.

Another exemplary embodiment of the water treatment composition comprises guar and polyaluminum sulfate.

Another exemplary embodiment of the water treatment composition comprises guar and polyaluminum silicate chloride.

Another exemplary embodiment of the water treatment composition comprises guar and polyaluminum silicate sulfate.

Another embodiment of the water treatment composition comprises free-flowing solid granules or powders of a water-soluble natural non-chemically derivatized polysaccharide(s) derived from a plant, microbe or animal that is admixed together with a free-flowing solid of aluminum sulfate (alum), polyaluminum chloride, aluminum chlorohydrate, polyaluminum silicate sulfate, polyaluminum silicate chloride, polyaluminum sulfate, sodium aluminate, or polyaluminum chlorohydrate granules and/or powders.

The water treatment composition can also contain a preservative to prevent the growth of microorganisms including bacteria, fungi and/or yeast. Preservatives can include, but are not limited to, sodium benzoate, potassium sorbate, parabins, sorbic acid, and benzoic acid.

The polysaccharide(s) that comprise the water treatment composition can include combinations of the following natural non-derivatized polysaccharides: galactomannans; glucomannans; $\alpha$-D glucans; xyloglucans; arabinoxylans; inulins; linear polysaccharides of alternating $\alpha$-(1-3)- and $\alpha$-(1-4) galactopyranose units; linear polysaccharides of glycosidically linked units of $\alpha$-D-glucopyranose; linear polysaccharides of glycosidically linked units of $\alpha$-D-glucopyranose; heteropolymers of glycosidically linked units of both $\alpha$-(1-4)-2-acetamido-2-deoxy-D-glucopyranose and $\alpha$-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan.

The water treatment composition can be comprised of a commercially effective water-clarifying combination of natural non-derivatized polysaccharides and contain either polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate, or combinations thereof.

Another embodiment of a water treatment composition is comprised of a commercially effective water-clarifying combination of polyaluminum chloride and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or and aminoacid homopolymers, such as polyglutamic acid, may be used.

Another embodiment of a water treatment composition is comprised of a commercially effective water-clarifying combination of aluminum chlorohydrate and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or aminoacid homopolymers, such as polyglutamic acid, may be used.

Another embodiment of a water treatment composition is comprised of a commercially effective water-clarifying combination of polyaluminum chlorohydrate and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or aminoacid homopolymers, such as polyglutamic acid, may be used.

Another embodiment of a water treatment composition is comprised of a commercially effective water-clarifying combination of aluminum sulfate and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or aminoacid homopolymers, such as polyglutamic acid, may be used.

Another embodiment of a water treatment composition is comprised of a commercially effective water-clarifying combination of sodium aluminate and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or aminoacid homopolymers, such as polyglutamic acid, may be used.

Another embodiment of a water treatment composition is comprised of a commercially effective water-clarifying combination of polyaluminum sulfate and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or aminoacid homopolymers, such as polyglutamic acid, may be used.

Another embodiment of a water treatment composition is comprised of a commercially effective water-clarifying combination of polyaluminum silicate chloride and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or amino-acid homopolymers, such as polyglutamic acid, may be used.

Another embodiment of a water treatment composition is comprised of a commercially effective water-clarifying combination of polyaluminum silicate sulfate and a polysaccharide(s) or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or amino-acid homopolymers, such as polyglutamic acid, may be used.

Another embodiment of a water treatment composition/formulation is comprised of a commercially effective water-clarifying combination of any two or more of polyaluminum chloride, aluminum chlorohydrate, polyaluminum chlorohydrate, sodium aluminate, polyaluminum sulfate, polyaluminum silicate chloride, polyaluminum silicate sulfate, and aluminum sulfate, or a combination of all aluminum compounds and a polysaccharide or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan. Additionally or alternatively, the milk-derived protein sodium caseinate and/or hydrolyzed casein and/or aminoacid homopolymers, such as polyglutamic acid, may be used.

Another embodiment of a water treatment composition is comprised of a commercially effective water-clarifying combination of polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate and a polysaccharide or a combination of polysaccharides selected from the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan.

Another embodiment of a water treatment composition comprises a guar-aluminum complex created by mixing a solution of polyaluminum chloride with an aqueous solution of dissolved guar. The composition solution is approximately 50% (wt/wt.) of polyaluminum chloride solution (for example, Kemira PAX-XL8 or PAX-XL6) and 50% (wt./wt.) of a 1% (wt./wt.) guar (for example, Guar Gum 50, FCC grade from Univar).

Another embodiment of a water treatment composition comprises a guar-aluminum complex created by slowly adding 100 g of polyaluminum chloride (for example, Kemira PAX-XL6, 10.3% $Al_2O_3$), to 250 g aqueous 1% guar (for example, Univar 50) while mixing followed by adding 150 g of aqueous alum (for example, Univar 48% aluminum sulfate). The composition solution is approximately 20% (wt/wt.) of polyaluminum chloride solution and 50% (wt./wt.) of a 1% guar solution and 30% (wt./wt.) of a 48% aluminum sulfate solution.

Another embodiment of a water treatment composition comprises a guar aluminum complex created by mixing a solution of aluminum sulfate with solid water-soluble guar. The composition is approximately 24% (wt./wt.) aluminum sulfate and 0.5% (wt./wt.) guar (for example, Univar guar gum 50 lot 10202008).

In some embodiments, a method for clarifying and reducing the turbidity of water by treating the water with a water treatment composition comprised of guar and polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate or a combination thereof so as to cause the agglomeration and subsequent removal of shear-stable insoluble suspended and/or partially water-soluble flocs and aggregates by collection on or within a filter media that allows easier more efficient backwashing and improved prolonged use of said filter media. The method comprises adding an effective amount of the water treatment composition to the water containing insoluble suspended and/or partially water soluble dissolved material and allowing the water treatment composition to interact with the suspended insoluble or soluble matter in order to allow the matter to agglomerate and settle under gravity and/or float to the surface. The agglomerated matter can be separated from the water by any of a number of means known in the art such as filtration, gravity settling, centrifugation, cyclone separator, vacuum filtration, or by flotation and skimming.

The filter media can include sand, diatomaceous earth, zeolite, carbon, non-woven or woven geotextile bags, filter cartridge bags, rope filters, woven or non-woven polypropylene or polyethylene mesh, cellulosic fabrics, metal or stainless steel screens.

The suspended insoluble matter can include the following: microorganisms such as bacteria, viruses, protozoans (Cryptosporidium or Giardia oocysts); proteins, oils, fats, algae, organic matter including hydrocarbons and insoluble starches; pharmaceutical ingredients such as materials used to prepare vaccines; nutraceuticals; commercially useful industrial fibers; suspended sludge materials from municipal and industrial wastewater; dredging solids; suspended materials from mine tailings; suspended metal oxides, or metal oxide hydroxides, graphite particles; carbon particles; suspended materials from oil and gas drilling and/or hydraulic fracturing operations; suspended matter in recreational or water derived from aquaculture operations or aquariums; suspended matter present in construction runoff; and suspended matter present in water from oil refinery operations.

When the water treatment composition containing polyaluminum chloride and guar is added to an aqueous body containing insoluble suspended and/or partially water-soluble material, enhanced flocculation efficiency is observed that is synergistic compared to the flocculation efficiency observed from adding either polyaluminum chloride or guar alone when used at an equal dose.

Another embodiment is a method for removing a phosphate-containing compound, such as orthophosphate, from water comprising adding a water treatment composition containing guar and polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate or a combination thereof to phosphate-containing water to remove or reduce the phosphate concentration more than can be removed by either guar or polyaluminum chloride or alum alone when used at the same dose. The phosphate can be removed by filtration or gravity settling.

DESCRIPTION OF THE DRAWINGS

The foregoing aspects and many of the attendant advantages of this invention will become more readily appreciated as the same become better understood by reference to the following detailed description, when taken in conjunction with the accompanying FIGURES.

DETAILED DESCRIPTION

Removal of suspended particulate or soluble matter in aqueous fluids can be accomplished by coagulation and flocculation followed by settling, skimming, filtration, centrifugation or any combination thereof. Coagulation often involves the use of multivalent inorganic metal salts such as aluminum sulfate (alum), aluminum chloride, polyaluminum chloride, aluminum chlorohydrate, polyaluminum chlorohydrate, iron sulfate, or iron chloride.

Flocculants such as chitosan or polyacrylamides have also been used separately or in combination with alum or polyaluminum chloride to treat water for reducing turbidity and/or removing suspended solid matter. Although the combination may offer improved coagulation, flocculation and floc size, the resulting floccules may still exhibit low shear strength and come apart when subjected to low to moderate pressure or agitation. Improved backwashing of filters containing flocculated insoluble materials that do not cling to the filter media but release easily from the filter media during backwashing cycles would be of significant value. The use of a natural non-charged polysaccharide, such as guar, in combination with an aluminum-containing coagulant, such as polyaluminum chloride or aluminum chlorohydrate or polyaluminum chlorohydrate or aluminum sulfate or sodium aluminate or polyaluminum sulfate or polyaluminum silicate chloride or polyaluminum silicate sulfate, or some combination thereof may allow for easy and more efficient backwashing. Other natural non-charged polysaccharides may include locust bean gum, starch, konjac, and cellulose.

The water treatment composition used in the methods for clarifying water, reducing the turbidity of water, and removing phosphate from water includes an aluminum-containing coagulant or a combination of aluminum-containing coagulants, and a natural non-charged polysaccharide or combination of natural non-charged polysaccharides. Optionally, the water treatment composition may include water. The water treatment composition may be applied as a solution or in a dry solid form. The aluminum-containing coagulant, and the natural non-charged polysaccharide may be applied together in solution, or in dry solid form, or in a complexed form. The aluminum-containing coagulant, and the natural non-charged polysaccharide may be applied separately, each being in a solution or in a dry solid form. The aluminum-containing coagulants and the natural non-charged polysaccharides are described further below.

Aluminum-Containing Coagulants

The aluminum-containing coagulants are readily commercially available. The aluminum-containing compounds may be applied as aqueous solutions or in a dry (solid) powder or granular form. The following may be used singly or in combination: polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate.

Aluminum sulfate has the formula, $Al_2(SO_4)_3 \cdot xH_2O$, wherein X is reported to be 13, 14, 15, 16, 17, or 18, or a combination. Solutions can be defined by the aluminum content or expressed in terms of equivalent alumina $Al_2O_3$.

Polyaluminum chloride may have the formula $Al_m(OH)_n Cl_{(3m-n)}$, wherein $0 < n \le 3m$, and $m \ge 1$. See U.S. Pat. No. 7,846,318, incorporated herein expressly by reference. The species can form polymers in water. The ph correlates to the formula $n/(3m)$. The higher the basicity of a coagulant, the lower the alkalinity consumption and, therefore, the less the pH of the water is reduced. Basicity can range from about 15% to about 83% w/w in commercially available polyaluminum chlorides. Basicity can be low, medium, or high basicity. Basicity can range from about 10% to about 83%, and any range derivable therebetween, such as between any range beginning from 10%, 20%, 30%, 40%, 50%, 60%, or 70%, and ending at 20%, 30%, 40%, 50%, 60%, 70, or 80%.

Some polyaluminum chorides may have sulfate. In the literature, these compounds are also sometimes referred to as polyaluminum chlorides, and sometimes as polyaluminum chorosulfates. The formula of some polyaluminum chlorides (polyaluminum chorosulfates) may be $Al_n OH_m (SO_4)_k Cl_{(3n-m-k)}$. Sulfate can range about 2% to 3% by weight.

Aluminum chlorohydrate is the name of the polyaluminum chloride where n=2, and m=5. Aluminum chlorohydrate may have the formula $Al_2Cl(OH)_5$, which has a basicity of about 83%.

Suitable aluminum-containing coagulants are available from Kemira Chemicals, Inc. under the designation PAX.

Polysaccharides

The polysaccharide(s) that comprise the water treatment composition can include combinations of the following natural non-derivatized polysaccharides: galactomannans; glucomannans; α-D glucans; xyloglucans; arabinoxylans; inulins; linear polysaccharides of alternating α-(1-3)- and α-(1-4) galactopyranose units; linear polysaccharides of glycosidically linked units of α-D-glucopyranose; linear polysaccharides of glycosidically linked units of α-D-glucopyranose; heteropolymers of glycosidically linked units of both α-(1-4)-2-acetamido-2-deoxy-D-glucopyranose and α-(1-4)-2-amino-2-deoxy-D-glucopyranose. Representative examples, although not exhaustive, include guar and locust bean gums, gum arabic, gum tragacanth, starches (branched and linear), agars, carrageenans, pectins, xanthan, konjac, cellulose, chitin, and chitosan.

A natural non-charged polysaccharide includes guar. Guar (guar gum) is a straight chain galactomannan with galactose on every other mannose unit. Beta 1-4 glycosidic linkages couple the mannose units and the galactose side chains are linked by alpha 1-6. A suitable guar gum for use is available from Univar, Inc. Other natural non-charged polysaccharides may include locust bean gum, starch, konjac, and cellulose.

Some embodiments of a method for clarifying water or removing phosphate from water include the steps: adding an aluminum-containing coagulant selected from polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate or a combination thereof, and a synergistic amount of a natural, non-charged polysaccharide to water containing matter; forming agglomerations in the water comprising the matter, the aluminum-containing compound, and the polysaccharide; and removing the agglomerations from the water to remove the matter from the water.

In some embodiments, the natural, non-charged polysaccharide is guar.

In some embodiments, adding the aluminum-containing coagulant and polysaccharide comprises adding a solution of aluminum-containing coagulant and guar.

In some embodiments, adding the aluminum-containing coagulant and polysaccharide comprises adding solid forms of aluminum-containing coagulant and guar.

In some embodiments, the aluminum-containing coagulant is substantially 100% by weight polyaluminum chloride.

In some embodiments, the aluminum-containing coagulant is substantially 100% by weight aluminum chlorohydrate.

In some embodiments, the aluminum-containing coagulant is substantially 100% by weight polyaluminum chlorohydrate.

In some embodiments, the aluminum-containing coagulant is substantially 100% by weight aluminum sulfate.

In some embodiments, the aluminum-containing coagulant is substantially 100% by weight sodium aluminate.

In some embodiments, the aluminum-containing coagulant is substantially 100% by weight polyaluminum sulfate.

In some embodiments, the aluminum-containing coagulant is substantially 100% by weight polyaluminum silicate chloride.

In some embodiments, the aluminum-containing coagulant is substantially 100% by weight polyaluminum silicate sulfate.

In some embodiments, the aluminum-containing coagulant comprises a solution of polyaluminum chloride and water.

In some embodiments, the aluminum-containing coagulant comprises a solution of aluminum chlorohydrate and water.

In some embodiments, the aluminum-containing coagulant comprises a solution of polyaluminum chlorohydrate and water.

In some embodiments, the aluminum-containing coagulant comprises a solution of aluminum sulfate and water.

In some embodiments, the aluminum-containing coagulant comprises a solution of sodium aluminate and water.

In some embodiments, the aluminum-containing coagulant comprises a solution of polyaluminum sulfate and water.

In some embodiments, the aluminum-containing coagulant comprises a solution of polyaluminum silicate chloride and water.

In some embodiments, the aluminum-containing coagulant comprises a solution of polyaluminum silicate sulfate and water.

In some embodiments, the aluminum-containing coagulant is a solution made with the compound having the formula $Al_m(OH)_nCl_{(3m-n)}$, wherein $0 < n \leq 3m$, and $m \geq 1$.

In some embodiments, the aluminum-containing coagulant is a solution made with the compound having the formula $Al_2(SO_4)_3 \cdot xH_2O$.

In some embodiments, the aluminum-containing coagulant is a solution made with the compound having the formula $Al_2Cl(OH)_5$.

In some embodiments, the ratio of polysaccharide to aluminum-containing coagulant is about 1:34.

In some embodiments, the ratio of polysaccharide to aluminum-containing coagulant is about 1:48.

In some embodiments, the ratio of polysaccharide to aluminum-containing coagulant ranges from about 1:10 to about 1:100.

In some embodiments, the aluminum-containing coagulant and the polysaccharide are added as a guar aluminum complex.

In some embodiments, the guar aluminum complex is made by the process comprising adding solid guar to a solid aluminum-containing coagulant and adding water to the solid guar and aluminum-containing coagulant.

In some embodiments, the aluminum-containing compound and polysaccharide are added together.

In some embodiments, the aluminum-containing compound and polysaccharide are added separately.

In some embodiments, the phosphate that is removed is orthophosphate.

In some embodiments, the matter in the water includes microorganisms, bacteria, viruses, protozoans, Cryptosporidium oocysts, Giardia oocysts; proteins, oils, fats, algae, hydrocarbons, metal oxides, metal oxide hydroxides, insoluble starches; pharmaceuticals, nutraceuticals; fibers, polyaramids, dredging solids; suspended materials from mine tailings, graphite particles, carbon particles, suspended materials from oil or gas drilling or hydraulic fracturing; suspended matter in recreational or water derived from aquaculture operations or aquariums; suspended matter present in construction runoff; and suspended matter present in water from oil refinery operations.

In some embodiments, the polysaccharide is a natural non-charged polysaccharide selected from locust bean gum, starch, konjac, or cellulose.

Some embodiments of a method for clarifying water include the steps: adding an aluminum-containing coagulant selected from polyaluminum chloride, aluminum chlorohydrate, polyaluminum chlorohydrate, aluminum sulfate, sodium aluminate, polyaluminum sulfate, polyaluminum silicate chloride, polyaluminum silicate sulfate or a combination thereof, and a synergistic amount of a natural, non-charged polysaccharide to water containing a phosphate compound; forming agglomerations in the water comprising the phosphate compound, the aluminum-containing coagulant, and the polysaccharide; and removing the agglomerations from the water to remove the phosphate compound from the water.

In some embodiments, the phosphate compound is orthophosphate.

In some embodiments, the polysaccharide is guar.

In some embodiments, the aluminum-containing compound is polyaluminum chloride.

In some embodiments, the aluminum-containing compound is aluminum chlorohydrate.

In some embodiments, the aluminum-containing compound is polyaluminum chlorohydrate.

In some embodiments, the aluminum-containing compound is aluminum sulfate.

In some embodiments, the aluminum-containing compound is sodium aluminate.

In some embodiments, the aluminum-containing compound is polyaluminum sulfate.

In some embodiments, the aluminum-containing compound is polyaluminum silicate chloride.

In some embodiments, the aluminum-containing compound is polyaluminum silicate sulfate.

In some embodiments, the ratio of polysaccharide to aluminum-containing coagulant is about 1:34.

In some embodiments, the ratio of polysaccharide to aluminum-containing coagulant is about 1:48.

In some embodiments, the ratio of polysaccharide to aluminum-containing coagulant ranges from about 1:10 to about 1:100.

EXAMPLES

Example 1

Demonstration of Synergy of Guar and Aluminum Sulfate in Turbidity Reduction

1. Fill four glass scintillation (glass) vials each with 20-ml of flow-back/produced water
2. Mark one as "control", cap and set aside
3. Add one or two drops of 1% by weight guar solution to two of the three remaining vials, cap and shake.
4. Add 48% by weight aluminum sulfate/water solution using the equivalent number drops used in Step #3 to the third vial without guar and to one of the two vials treated with 1% guar solution, cap and shake.
5. Shake all four capped scintillation (glass) vials again and set aside at ambient T.
6. View flocculation and clarification performance.

TABLE 3

Initial alum/guar jar test key and results

| TREATMENT | CONTENTS | | RESULTS |
|---|---|---|---|
| | 48% Alum | 1% guar | |
| Control | NA | NA | No change |
| 1 | NA | Yes | No change |
| 2 | Yes | Yes | Floc/Cleared |
| 3 | Yes | NA | No change |

Results:

No observable flock or settling was observed in the produced water samples treated with alum alone or guar alone. There was significant settling observed in the sample treated with guar first followed by alum. There was no change in the untreated sample labeled "control".

Discussion:

There appears to be a certain synergy present when alum and guar are used in combination. The sample treated with alum alone was unable to clear the sample and the same for the sample treated with guar alone. Only the sample containing both alum and guar produced a result.

Example 2

Demonstration of Synergy of Guar and Aluminum Sulfate in Phosphate Reduction

Procedure

Orthophosphate-spiked water was prepared by adding 1.719 ml of phosphate standard solution (from PAS-STM-8039 02 of phosphate procedure) to 1 liter of deionized water. 100 ml of orthophosphate-spiked water was dispensed into plastic sample cups.

1. Aluminum sulfate (48% by weight aluminum sulfate hydrate, 52% by weight water was used neat (undiluted).

2. Hybrid E—Guar aluminum complex created by mixing a solution of aluminum sulfate with solid water-soluble guar. The composition is approximately 24% (wt./wt.) alum and 0.5% (wt./wt.) guar (Univar guar gum 50).

3. 100 microliters of either Aluminum sulfate or Hybrid E was added to 100 ml of orthophosphate-spiked water which was mixed and allowed to sit for various time periods. Controls received 100 microliters of water alone. Following the various time periods, 12 ml of each treated water sample was filtered through a 0.45 micron filter, diluted 1:10 with deionized water and reacted with 1 powder pillow of HACH reagent PhosVer 3 and the phosphate concentration determined spectophotometrically using a HACH spectrophotometer. In other experiments, the phosphate concentration of the treated water was tested without filtration.

Results

As shown in Table 1, Alum and Hybrid E reduced the phosphate concentration by 24% and 27% respectively compared to the non-treated control.

TABLE 1

Phosphate concentration of filtered treated water following overnight incubation at room temperature

| Treatment | Phosphate Concentration of 1:10 dilution (ppm) | Phosphate concentration in treated water corrected for 1:10 dilution (ppm) | Percent Removal |
|---|---|---|---|
| Control | 1.29 | 12.9 | 0% |
| Alum neat | 0.98 | 9.8 | 24% |
| Hybrid E | 0.94 | 9.4 | 27% |

100 microliters of either Alum, or Hybrid E was added to 100 ml of orthophosphate-spiked water contained in a 100 ml graduated cylinder and mixed. After sitting undisturbed for two hours at RT (room temperature), water was sampled from the top (100-90 ml), middle (50-40 ml) or bottom (20-10 ml) portion of each graduated cylinder. Sampled water was diluted 1:10 with deionized water and tested without filtration spectrophotometrically for phosphate concentration using powder pillows of HACH PhosVer 3 reagent.

Results are shown in table 2 below.

TABLE 2

Phosphate concentration of treated water sampled at various levels in a graduated cylinder. Control phosphate water contained 10 ppm

| Treatment | Top (100-90 ml) Phosphate conc. (ppm) | Middle (50-40 ml) Phosphate conc. (ppm) | Bottom (20-10 ml) Phosphate conc. (ppm) |
|---|---|---|---|
| Alum | 8.8 | 8.9 | 8.9 |
| Hybrid E | 8.1 | 8.3 | 8.0 |

Conclusion

Hybrid E appeared to reduce orthophosphate concentrations similar to alum using about half the amount of alum.

Example 3

Testing of Various PACs with Guar

Product Testing Method:

1. 200 grams of Arizona Fine Dust ((PTI ID: 10943F) was mixed in 10 liters of DI H20 to prepare the Arizona test dust solution.
2. 1N HCl was added to the Arizona test dust solution to bring the pH to 7.2 from a pH of 9.4.
3. 500 mls of Arizona test dust solution was poured into separate 500 ml bottles and labeled respective to the guar/PAC formulation being added.
4. The respective guar/PAC formulation each containing a different PAC, was added to 500 ml of Arizona test dust solution to a final concentration of 50 ppm and mixed for approximately two minutes and then allowed to settle for ten minutes (the concentration of guar and aluminum was the same for each formulation. Following ten minutes of settling, turbidity was measured for each Arizona test dust solution that was treated with the respective guar/PAC formulation. Control non-treated Arizona test dust solution exhibited a turbidity of approximately 8000 NTU.

Figure 1:
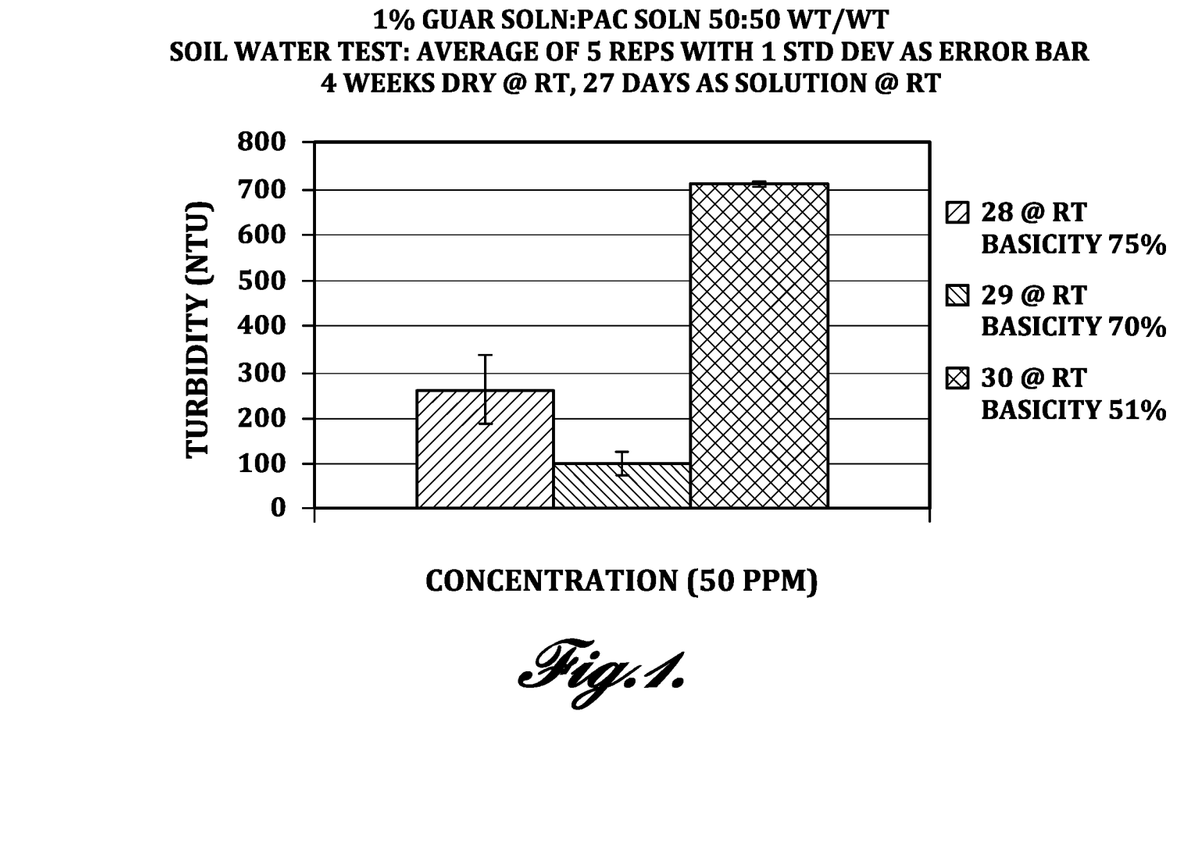
FIG. 1 is a graph illustrating results of turbidity reduction using guar and various samples of polyaluminum chloride.

The results shown in FIG. 1 clearly demonstrate that formulation 29-RT exhibiting a basicity of 70% performed significantly better at reducing turbidity compared the formulations 28RT and 30RT that exhibited a basicity of 75% and 51% respectively. Values represent the average of five replicates.

Description of the Samples:

240-48-28-RT 0.5 grams of guar (Univar, Lot #10202008) was added to 17.22 grams of Grade 28 PAC and stored as powder at room temperature on Dec. 20, 2012. After 4 weeks on Feb. 6, 2013, 82.28 grams of DI water was added, and mixed for about 2 hours. The solution was then held and stored as liquid for 27 days then tested. Grade 28 PAC has a basicity of 75% and an $Al_2O_3$ content of 30.2%.

240-48-29-RT 0.5 grams of guar was added to 16.99 grams of Grade 29 PAC and stored as powder at room temperature on Dec. 20, 2012. After 4 weeks on Feb. 6, 2013, 82.51 grams of DI water was added, and mixed for about 2 hours. The solution was then held and stored as liquid for 27 days then tested. Grade 29 PAC has a basicity of 70% and an $Al_2O_3$ content of 30.6%.

240-48-30-RT Liquid 0.5 grams of guar was added to 16.99 grams of Grade 30 PAC and stored as powder at room temperature on Dec. 20, 2012. After 4 weeks on Feb. 6, 2013, 82.51 grams of DI water was added, and mixed for about 2 hours. The solution was then held and stored as liquid for 27 days then tested. Grade 30 PAC has a basicity of 51% and an $Al_2O_3$ content of 30.6%.

Results

FIG. 1 is an illustration of graph showing the results. Turbidity is reported in NTU. The sample 29@RT was the most effective in reducing turbidity. At 50 ppm, 29@RT reduced turbidity to approximately 100 NTU, compared to approximately 300 NTU by 28@RT, and approximately 700 NTU by 30@RT.

Example 4

A sample of frac pit water (sometimes referred to as drill water) from Bear Creek Services (Contly 27-H #1 34-H #1). The amount dosed was added to 20 ml of sample, mixed, and then rested for 5 minutes before the turbidity was measured. The results are in the Table 3 below:

| 20 ml sample | Control | 1% Guar | PAX-XL6 | 213-133-B |
|---|---|---|---|---|
| Amount dosed | 0 | 25 mg | 25 mg | 50 mg |
| NTU (5 min) | 740 | 760 | 860 | 320 |

Formula 213-133-B is 50% by weight Kemira PAX-XL6 poly aluminum chloride (basicity 55%, $Al_2O_3$ 10.3%, Al 5.31%, Sulfate 2.5%), 50% by weight 1% guar solution in water (Univar 45 Guar). To make the product, the PAC is slowly added to guar solution while mixing, to get a uniform solution.

Example 5

Testing of Guar/PAC Vs. Guar/Alum

Product Testing Method 1. 200 grams of Arizona Fine Dust ((PTI ID: 10943F) was mixed in 10 liters of DI H20 to prepare the Arizona test dust solution.
2. 1N HCl was added to the Arizona test dust solution to bring the pH to 7.2 from a pH of 9.4.

3. 500 mls of Arizona test dust solution was poured into separate 500 ml bottles.

4. The guar/PAC formulation and the guar/alum formulation was each added to separate 500 ml aliquots of Arizona test dust solution to a final concentration of 50 ppm and then mixed for approximately two minutes and then allowed to settle for ten minutes. The P-50 formulation is 50% by weight Kemira PAX-XL8 polyaluminum chloride (basicity ~70%, $Al_2O_3$ 10%, Al 5.5%) and 50% by weight 1% guar solution in water. The A48 formulation is the same as Hybrid E described earlier). Following ten minutes of settling, turbidity was measured for each Arizona test dust solution that was treated with the respective guar/PAC formulation. Control non-treated Arizona test dust solution exhibited a turbidity of approximately 8000 NTU.

Figure 2:
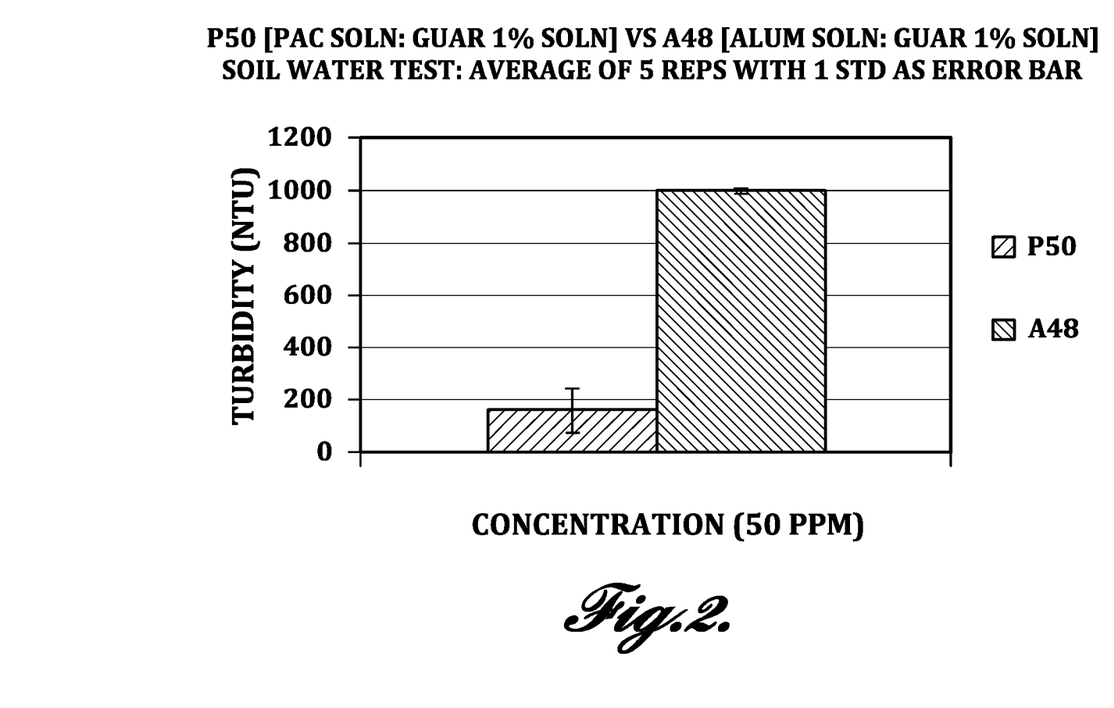
FIG. 2 is a graph illustrating results of turbidity reduction using guar with polyaluminum chloride and guar with alum.

The results are shown in FIG. 2, wherein the values represent the average of five replicates. The results clearly demonstrate that the P-50 formulation performed significantly better at reducing turbidity compared to the A48 (Hybrid E) formulation. Compare approximately 180NTU to 1000 NTU.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for reducing the turbidity of water comprising suspended matter, the method comprising:
    adding to the water comprising suspended matter a composition consisting of: (i) aluminum chlorohydrate having a basicity of about 83%, (ii) uncharged guar, and (iii) water;
        wherein a weight ratio of aluminum chlorohydrate to uncharged guar in the composition is between 10:1 and 100:1;
    forming agglomerations in the water comprising the suspended matter, the aluminum chlorohydrate, and the uncharged guar; and
    removing the agglomerations from the water to reduce the turbidity of the water comprising suspended matter.

2. The method of claim 1, wherein the adding step comprises either: i) adding a liquid solution of the aluminum chlorohydrate and uncharged guar to said water containing suspended matter, or ii) adding solid forms of the aluminum chlorohydrate and the uncharged guar to the water containing suspended matter.

3. The method of claim 1 wherein said water containing suspended matter comprises a phosphate.

4. The method of claim 1 wherein the suspended matter is one or more item selected from the group consisting of microorganisms, bacteria, viruses, protozoans, Cryptosporidium oocysts, Giardia oocysts, proteins, oils, fats, algae, hydrocarbons, metal oxides, metal oxide hydroxides, insoluble starches, pharmaceuticals, nutraceuticals, fibers, polyaramids, dredging solids, suspended materials from mine tailing, graphite particles, carbon particles, suspended materials from oil or gas drilling or hydraulic fracturing, suspended matter in water used in recreational activities or water derived from aquaculture operations or aquariums; suspended matter present in construction runoff, suspended matter present in water from refinery operations.

5. A method for reducing the turbidity of water comprising suspended matter, the method comprising:
    adding to the water comprising suspended matter a composition consisting of, aluminum chlorohydrate having a basicity of about 83%, water, and uncharged guar,
        wherein a weight ratio of aluminum chlorohydrate to uncharged guar in the composition is 100:1;
    forming agglomerations in said water comprising the suspended matter, the aluminum chlorohydrate, and the uncharged guar; and
    removing the agglomerations from the water to reduce the turbidity of the water containing suspended matter.

6. The method of claim 5 wherein said water comprising suspended matter comprises a phosphate.

7. The method of claim 5 wherein the suspended matter is one or more item selected from the group consisting of microorganisms, bacteria, viruses, protozoans, Cryptosporidium oocysts, Giardia oocysts, proteins, oils, fats, algae, hydrocarbons, metal oxides, metal oxide hydroxides, insoluble starches, pharmaceuticals, nutraceuticals, fibers, polyaramids, dredging solids, suspended materials from mine tailing, graphite particles, carbon particles, suspended materials from oil or gas drilling or hydraulic fracturing, suspended matter in water used in recreational activities or water derived from aquaculture operations or aquariums; suspended matter present in construction runoff, suspended matter present in water from refinery operations.

\* \* \* \* \*